US010954763B2

(12) United States Patent
Martysevich et al.

(10) Patent No.: US 10,954,763 B2
(45) Date of Patent: Mar. 23, 2021

(54) METHOD AND SYSTEM FOR DISTRIBUTION OF A PROPPANT

(71) Applicant: HALLIBURTON ENERGY SERVICES, Houston, TX (US)

(72) Inventors: Vladimir Nikolayevich Martysevich, Spring, TX (US); Philip D. Nguyen, Houston, TX (US); Mehdi A. Shahri, Webster, TX (US); James W. Ogle, Spring, TX (US); Ronald Glen Dusterhoft, Katy, TX (US); Jesse Clay Hampton, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/344,328

(22) PCT Filed: Nov. 10, 2016

(86) PCT No.: PCT/US2016/061398
§ 371 (c)(1),
(2) Date: Apr. 23, 2019

(87) PCT Pub. No.: WO2018/089009
PCT Pub. Date: May 17, 2018

(65) Prior Publication Data
US 2019/0264552 A1  Aug. 29, 2019

(51) Int. Cl.
*E21B 33/12*  (2006.01)
*E21B 43/17*  (2006.01)
(Continued)

(52) U.S. Cl.
CPC .............. *E21B 43/17* (2013.01); *C09K 8/62* (2013.01); *C09K 8/80* (2013.01); *E21B 33/12* (2013.01); *E21B 43/267* (2013.01); *E21B 47/06* (2013.01)

(58) Field of Classification Search
CPC ........ E21B 33/12; E21B 43/17; E21B 43/267; E21B 47/06; C09K 8/62; C09K 8/80
See application file for complete search history.

(56) References Cited

U.S. PATENT DOCUMENTS 4,344,485 A * 8/1982 Butler ................. E21B 43/2405
                                                166/265
4,633,948 A    1/1987 Closmann
(Continued)

FOREIGN PATENT DOCUMENTS

WO    2012083047 A2    6/2012

OTHER PUBLICATIONS

International Search Report and Written Opinion; PCT Application No. PCT/US2016/061398; dated Jul. 28, 2017.
(Continued)

*Primary Examiner* — Matthew R Buck
(74) *Attorney, Agent, or Firm* — Polsinelli PC

(57) ABSTRACT

A method for directing a proppant in a subterranean formation including providing a first wellbore and a second wellbore, wherein the first wellbore and the second wellbore are disposed about a target area of the subterranean formation; creating a pressure differential between the first wellbore and the second wellbore, such that the pressure of one of the first wellbore or the second wellbore is at a higher pressure and the other of the first wellbore or second wellbore is at a lower pressure; and initiating a fracturing pressure in the higher pressure wellbore by pumping a fracturing fluid in the wellbore, the fracturing pressure sufficient to create a fracture at a predetermined location; whereby the fracturing fluid is drawn from the fractured wellbore toward the lower pressurized wellbore as a result of the pressure differential.

25 Claims, 8 Drawing Sheets

(51) Int. Cl.
*E21B 43/267* (2006.01)
*E21B 47/06* (2012.01)
*C09K 8/62* (2006.01)
*C09K 8/80* (2006.01)

(56) References Cited

U.S. PATENT DOCUMENTS

| | | | |
|---|---|---|---|
| 5,215,146 A * | 6/1993 | Sanchez | C09K 8/592 |
| | | | 166/272.3 |
| 6,158,517 A * | 12/2000 | Hsu | C22B 11/04 |
| | | | 166/402 |
| 8,360,157 B2 * | 1/2013 | Yale | E21B 43/30 |
| | | | 166/370 |
| 8,439,116 B2 | 5/2013 | East, Jr. et al. | |
| 8,490,695 B2 | 7/2013 | Bahorich et al. | |
| 8,517,091 B2 | 8/2013 | Bahorich et al. | |
| 8,733,444 B2 | 5/2014 | East, Jr. et al. | |
| 8,874,376 B2 | 10/2014 | Soliman | |
| 10,030,491 B2 * | 7/2018 | Pyecroft | E21B 43/26 |
| 2003/0066650 A1 | 4/2003 | Fontana et al. | |
| 2011/0030362 A1 | 2/2011 | Schmidt | |
| 2011/0259585 A1 | 10/2011 | Banerjee et al. | |
| 2013/0146293 A1 | 6/2013 | Zazovsky et al. | |
| 2014/0224493 A1 * | 8/2014 | Soliman | E21B 43/267 |
| | | | 166/308.1 |

OTHER PUBLICATIONS

Office Action; Canadian Application No. 3,035,831; dated Feb. 24, 2020.

* cited by examiner

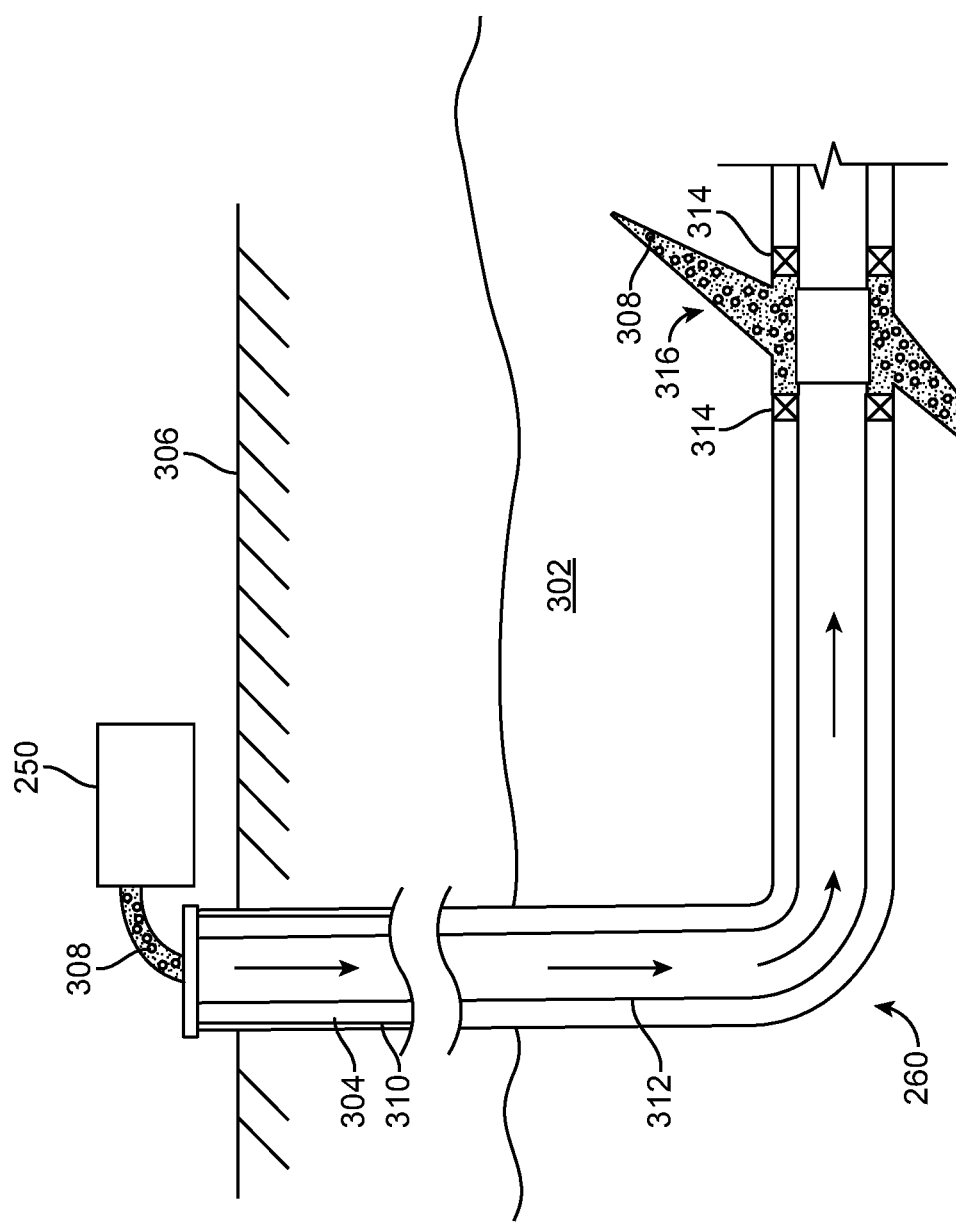

METHOD AND SYSTEM FOR DISTRIBUTION OF A PROPPANT

CROSS-REFERENCE TO RELATED APPLICATIONS

This application is a national stage entry of PCT/US2016/061398 filed Nov. 10, 2016, said application is expressly incorporated herein in its entirety.

FIELD

The present disclosure relates generally to multi-wellbore environments. In particular, the present disclosure relates to a method for controlling cross-flow between wellbores in a subterranean earth formation.

BACKGROUND

In order to produce oil or gas, a well is drilled into a subterranean earth formation, which may be a reservoir or adjacent to a reservoir. Various types of treatments are commonly performed on a well or subterranean formation. For example, stimulation is a type of treatment performed on a well to produce hydrocarbons, as well as restore or enhance the productivity of oil and gas from the well or subterranean formation. Stimulation treatments can include hydraulic fracturing; fracturing treatments are performed above the fracture pressure of the subterranean formation to create or extend a highly-permeable flow path between the formation and the wellbore.

A well or subterranean formation is normally treated with a treatment fluid. Such treatment fluid is typically adapted to be used to resolve a specific purpose, such as stimulation, isolation, or control of reservoir gas or water. "Hydraulic fracturing," sometimes referred to as "fracturing," is a common stimulation treatment. A treatment fluid adapted for this purpose is sometimes referred to as a "fracturing fluid." The fracturing fluid is pumped at a sufficiently high flow rate and pressure into the wellbore and into the subterranean formation to create or enhance a fracture in the subterranean formation.

When a fracture is formed or extended, fracturing fluid is provided a fluid flow path and can rapidly flow away from the wellbore. When the fracture is created or enhanced, the sudden increase in fluid flow away from the well reduces the pressure in the well. Thus, successful fracture is indicated by a sudden drop in fluid pressure, which can be observed in the wellhead.

The fractures tend to close after the pumping of the fracturing fluid is stopped. To prevent the fracture from closing, a material must be placed in the fracture to keep the fracture propped open. A material used for this purpose can be referred to as "proppant." The proppant can be in the form of a solid particulate, which can be suspended within the fracturing fluid, carried downhole, and deposited in the fracture as a "proppant pack." The proppant pack props the fracture in an open position, while the permeability of the pack allows for fluid flow throughout the fracture.

BRIEF DESCRIPTION OF THE DRAWINGS

Implementations of the present technology will now be described, by way of example only, with reference to the attached figures, wherein:

FIG. 3 is a diagram illustrating an example of a subterranean formation in which a fracturing operation may be performed in accordance with certain embodiments of the present disclosure;

DETAILED DESCRIPTION

Figure 1A:
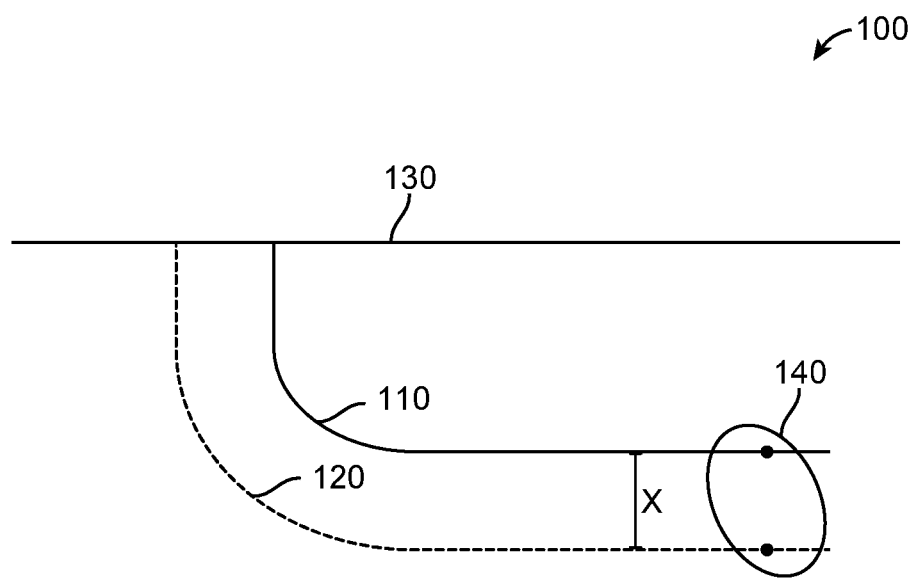
FIG. 1A is a diagram illustrating a first view of an exemplary environment for distribution of a proppant between multiple wellbores.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, reference to up or down is made for purposes of description with "up," "upper," "upward," or "uphole" meaning toward the surface of the wellbore and with "down," "lower," "downward," or "downhole" meaning toward the terminal end of the well, regardless of the wellbore orientation. Correspondingly, the transverse, axial, lateral, longitudinal, radial, etc., orientations shall mean orientations relative to the orientation of the wellbore or tool. Additionally, the illustrated embodiments are illustrated such that the orientation is such that the top of the page is toward the surface, and the lower side of the page is downhole.

Several definitions that apply throughout this disclosure will now be presented. The term "coupled" is defined as connected, whether directly or indirectly through intervening components, and is not necessarily limited to physical connections. The terms "comprising," "including" and "having" are used interchangeably in this disclosure. The terms "comprising," "including" and "having" mean to include, but not necessarily be limited to the things so described. Creating a fracture means making a new fracture within the formation. Enhancing a fracture means enlarging a pre-existing fracture within the formation.

Disclosed herein is a system and method for enhancing the distribution of a proppant throughout a subterranean earth formation. The method includes controlling cross-flow between two or more wellbores spaced about a target area within an subterranean formation, such as a hydrocarbon containing zone, within the formation. Cross-flow can be achieved by controlling the pressure within a first wellbore such that the wellbore pressure is maintained below the pressure of the adjacent earth formation, or in the alternative the wellbore can be kept at hydrostatic pressure. A second wellbore can be drilled at a different location adjacent to the target area and below the first wellbore. A proppant can be mixed with a fracturing fluid, and the combined fluid can be used to fracture the second wellbore. The pressure difference between the first wellbore and the second wellbore can direct the fractures toward the lower pressure wellbore. The proppants can be deposited throughout these fractures. Accordingly, by controlling the relative wellbore pressures, operators may direct the placement of fractures, fracturing fluid, and proppants throughout the target area between the two wellbores. The fractures can reach from one wellbore to another thereby providing a hydraulic connection between the wellbores. As used herein "hydraulic connection" refers to a fluidic communication between multiple wellbores via a fracture network. The fracture network can be used to direct the proppant to achieve increased vertical distribution. As a result, improved stimulation along with a larger net pay and higher inflow performance may be achieved.

Figure 1B:
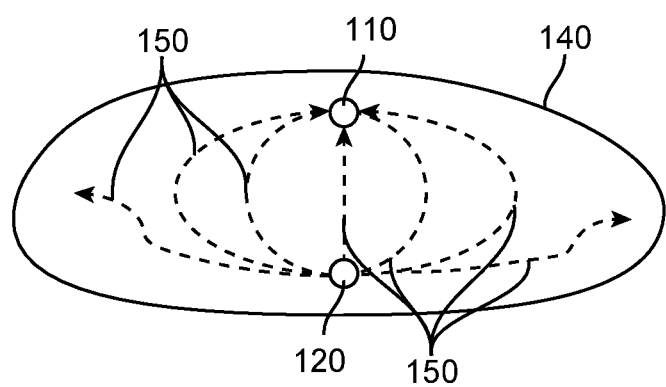
FIG. 1B is a second view of an exemplary environment for a distribution of a proppant between multiple wellbores.

The method can be implemented in an exemplary wellbore system shown, for example, in FIG. 1A. The system 100 includes a first wellbore 110 and a second wellbore 120 drilled into an earth formation 130 and disposed about a target area 140; the second wellbore 120 can be located below the first wellbore 110. The labeling of "first" and "second" wellbores is not necessarily indicative of any particular order of time with respect to drilling or achieving target pressures, but is for convenience of labeling. However, in practice the first wellbore 110 may be drilled or formed prior to the drilling of the second wellbore 120, or vice versa. The distance X between the first wellbore 110 and the second wellbore 120 can be any distance that will allow for hydraulic connection between the wellbores via fractures. The distance can be determined based on the target zone of the subterranean formation, for example, the distance X can be from about 10 feet to about 1000 feet, from about 100 feet to about 800 feet, from about 200 feet to about 500 feet, encompassing any subset value therebetween. The wellbores can be located at any point throughout, or adjacent to, the target area 140. FIG. 1B is a front view of the system 100 of FIG. 1A; the first wellbore 110 and the second wellbore 120 are disposed within the target area 140. Various potential fluid flow paths 150 can extend from the second wellbore 120 to the first wellbore 110. It should be noted that while FIGS. 1A and 1B depict a system 100 having only two wellbores, the present disclosure is equally well-suited for use in environments having any number of wellbores. Even though FIGS. 1A and 1B generally depict a land-based operation, those skilled in the art will readily recognize that the principles described herein are equally applicable to subsea operations that employ floating or sea-based platforms and rigs, without departing from the scope of the disclosure. Finally, while FIGS. 1A and 1B generally depict a horizontal wellbore, it should be readily apparent to those of skill in the art that a pressure differential can be used to divert fracture and liquid distribution in wellbores having other orientations as well.

Figure 2:
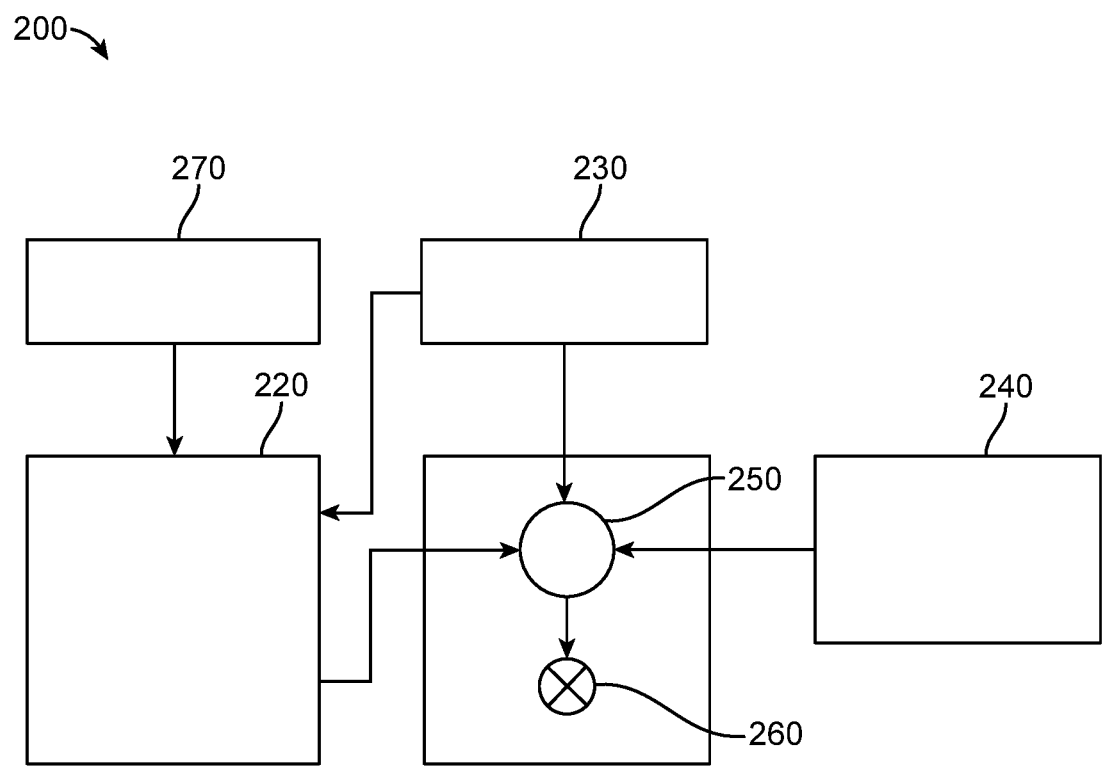
FIG. 2 is a diagram illustrating an example of a fracturing system that may be used in accordance with certain embodiments of the present disclosure.

The exemplary methods and systems disclosed herein may directly or indirectly affect one or more components or pieces of equipment associated with the preparation delivery, recapture, recycling, reuse, and/or disposal of the disclosed materials. For example, and with reference to FIG. 2, the disclosed methods and compositions may directly or indirectly affect one or more components or pieces of equipment associated with an exemplary fracturing system 200, according to one or more embodiments. In certain instances, the system 200 includes a fracturing fluid producing apparatus 220, a fluid source 230, a proppant source 240, and a pump and blender system 250 and resides at the surface at a well site where a well 260 is located. In certain instances, the fracturing fluid producing apparatus 220 combines a gel pre-cursor with a fluid (liquid or substantially liquid) from fluid source 230, to produce a hydrated fracturing fluid that is used to fracture the formation. The hydrated fracturing fluid can be a fluid for ready use in a fracture stimulation treatment of the well 260 or a concentrate to which additional fluid is added prior to use in a fracture stimulation of the well 260. In other instances, the fracturing fluid producing apparatus 220 can be omitted and the fracturing fluid sourced directly from the fluid source 230. In certain instances, the fracturing fluid may comprise one or more of water, a hydrocarbon fluid, a polymer gel, foam, air, wet gasses, and/or other fluids.

The proppant source 240 can include proppant particles for combination with the above described fracturing fluid. Proppant particulates that may be used in conjunction with the instant disclosure include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. The system may also include additive source 270 that provides one or more additives to alter the properties of the fracturing fluid. These additives can include, but are not limited to, gelling agents, weighting agents, cross-linking agents, binding agents, biocides, breakers, fillers, and other additives. For example, suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof. Additives can be included to reduce pumping friction, reduce or eliminate the fluid's reaction to the geological formation in which the well is formed, operate as surfactants, and/or to serve other functions.

The pump and blender system 250 receives the fracturing fluid and combines it with other components, including the proppant added by the proppant source 240 and/or additional fluid from the additives 270. The resulting mixture may be pumped down the well 260 under a pressure sufficient to create, or enhance, one or more fractures in a subterranean zone, for example, to stimulate production of fluids from the zone. Notably, in certain instances, the fracturing fluid producing apparatus 220, fluid source 230, and/or proppant source 240 may be equipped with one or more metering devices (not shown) to control the flow of fluids, to the pumping and blender system 250. Such metering devices may permit the pumping and blender system 250 to source from one, some, or all of the different sources at a given time, and may facilitate the preparation of fracturing fluids in accordance with the present disclosure using continuous mixing or "on-the-fly" methods. Thus, for example, the pumping and blender system 250 can at some point provide just fracturing fluid, just proppant, or combinations of those components.

FIG. 3 shows the well 260 during a fracturing operation in a portion of a subterranean earth formation of interest 302 surrounding a wellbore 304. The wellbore 304 extends from the surface 306, and the fracturing fluid 308 is applied to a portion of the subterranean earth formation 302 surrounding the horizontal portion of the wellbore. Although shown as vertical deviating to horizontal, the wellbore 304 may include horizontal, vertical, slant, curved, and other types of wellbore geometries and orientations, and the fracturing treatment may be applied to a subterranean zone surrounding any portion of the wellbore. The wellbore 304 can include a casing 310 that is cemented to otherwise secured to the wellbore wall. The wellbore 304 can be uncased or include uncased sections. One or more perforations can be formed at multi oriented angles in the casing 310 to allow fracturing fluids and/or other materials to flow into the subterranean formation 302. In cased wells, perforations can be formed using shape charges, an perforating gun, hydrojetting and/or other tools.

The well is shown with a work string 312 descending from the surface 306 into the wellbore 304. The pump and blender system 250 is coupled with a work string 312 to pump the fracturing fluid 308 into the wellbore 304. The work string 312 may include coiled tubing, jointed pipe, and/or other structures that allow fluid to flow into the wellbore 304. The work string 312 can include flow control devices, bypass valves, ports, and or other tools or well devices that control a flow of fluid from the interior of the work string 312 into the subterranean zone 302. For example, the work string 312 may include ports adjacent the wellbore wall to communicate the fracturing fluid 308 directly into the subterranean formation 302, and/or the working string 312 may include ports that are spaced apart from the wellbore wall to communicate the fracturing fluid 308 into an annulus in the wellbore between the work string 312 and the wellbore wall.

The work string 312 and/or the wellbore 304 may include one or more sets of packers 314 that seal the annulus between the work string 312 and wellbore 304 to define an interval of the wellbore 304 into which the fracturing fluid 308 will be pumped. FIG. 3 shows two packers 314, one defining an uphole boundary of the interval and one defining the downhole end of the interval. When the fracturing fluid 308 is introduced into the wellbore 304 (for example, in FIG. 3, the area of the wellbore 304 between packers 314) at a sufficient hydraulic pressure, one or more fractures 316 may be created in the subterranean zone 302. The proppant particulates in the fracturing fluid 308 may enter the fractures 316 where they may remain after the fracturing fluid flows out of the wellbore. These proppant particulates may "prop" fractures 316 such that fluids may flow more freely through the fractures 316.

While not specifically illustrated herein, the disclosed methods and compositions may also directly or indirectly affect any transport or delivery equipment used to convey the compositions to the fracturing system 200 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (such as, pressure and temperature), gauges, and combinations thereof, and the like.

Figure 4A:
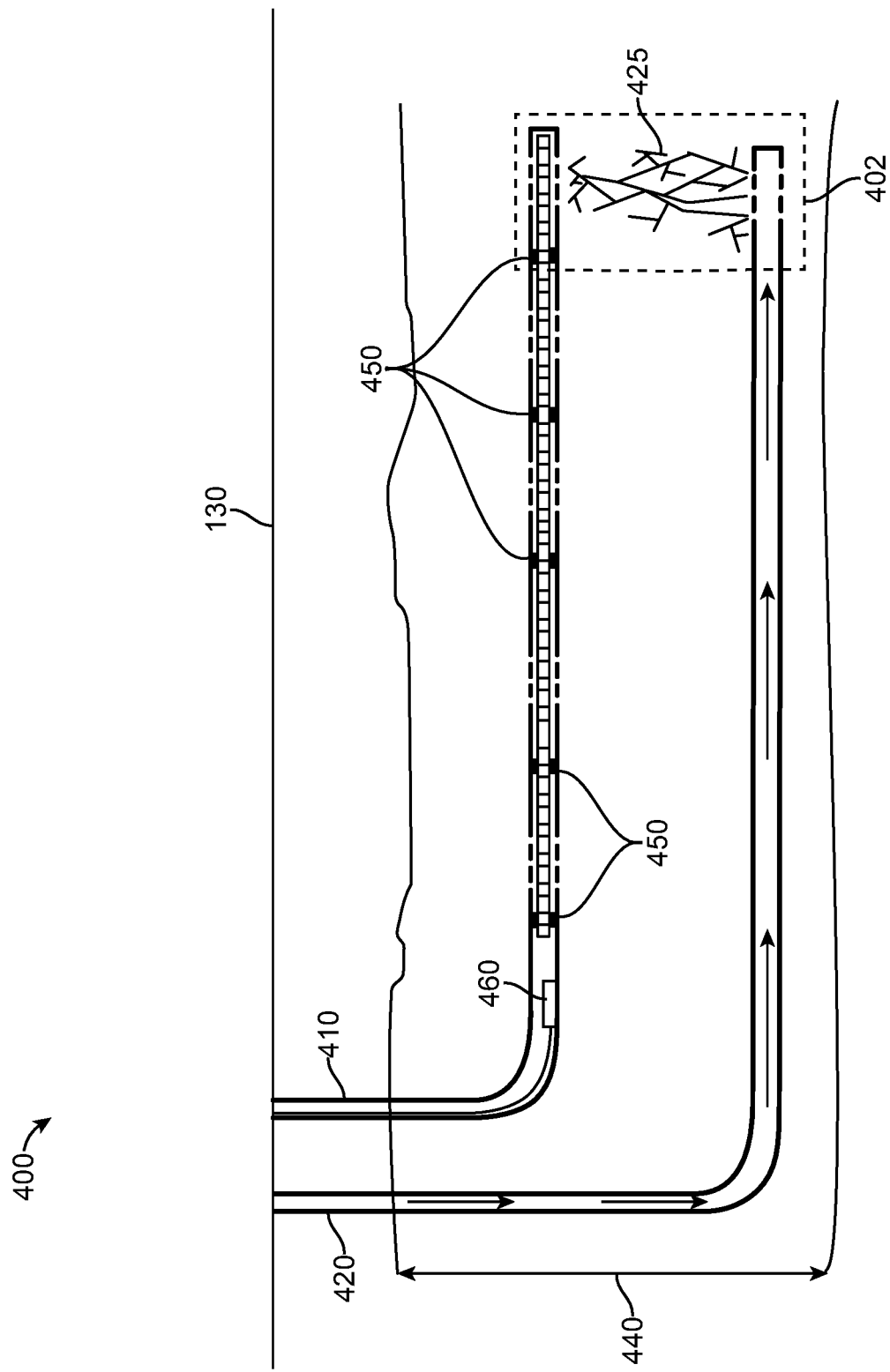
FIG. 4A is a diagram illustrating an exemplary wellbore network showing a vertical inbound fracture between two wellbores.

FIG. 4A illustrates an example method for dispersing a proppant throughout a two-wellbore system 400; both wellbores are located within a target area 440. In the illustrated embodiment, an upper (or first) wellbore 410 can be a mature wellbore, for example a wellbore that is previously fractured and pumped. One or more packers 450 can be located throughout the upper wellbore 410 from prior formation fluid extraction. A lower (or second) wellbore 420 can be drilled below the upper wellbore 410, such that the target area is disposed between the upper wellbore 410 and the lower wellbore 420. A pressure differential between the upper wellbore 410 and the lower wellbore 420 can be made in any number of ways. For instance, the lower wellbore 420 can be pressurized to a pressure higher than the upper wellbore 410, and then pressurized to a fracturing pressure, and/or simply pressed to the fracturing pressure. Simultaneously or alternatively, the pressure of the upper wellbore 410 can be lowered or kept at a hydrostatic pressure, or pressure lower than the lower wellbore 420 to create a pressure difference between the two wellbores. The lower wellbore 420 can then be fractured at a first location 402 using a fracturing fluid mixed with a proppant. The pressure differential between the upper wellbore 410 and the lower wellbore 420 directs the fractures towards the wellbore having the lower pressure, which in this case is upper wellbore 410. By controlling the relative pressures of two or more wellbores, fractures can be directed to a desired location.

The fractures can be extended until creation of an interwellbore hydraulic connection 425 between the upper wellbore 410 and lower wellbore 420. The presence of a hydraulic connection 425 between the two wellbores can be determined by a change in pressure of the pressurized wellbore. The pressure change can be detected through one or more pressure sensors 460 located throughout the wellbore including, but not limited to, fiber optic sensors. Sensors compatible with this method can be modified such that they are able to withstand extreme temperatures and pressures common in downhole environments. The low pressure directs the proppant to the desired area within the target area 440, providing enhanced vertical proppant distribution. The enhanced distribution can allow for increased formation fluid production throughout the subterranean formation. Once hydraulic connection has been established, and the desired amount of proppant has been distributed throughout the fractures, the pressure in the upper wellbore 410 can be reduced, and flowback in the upper wellbore 410 can be initiated by continued pumping into the lower wellbore 420. The flow paths created by the fractures direct the pumped fluid upward toward the upper wellbore 410. Such completion for the upper wellbore 410 can be beneficial to prevent sand production during the flowback. When pumping into the lower wellbore 420 is completed, the flowback in the upper wellbore 410 is continued causing force closure on the propped fracture. The force closure can prevent the proppant from settling and decrease closure time and well stand by.

Figure 4B:
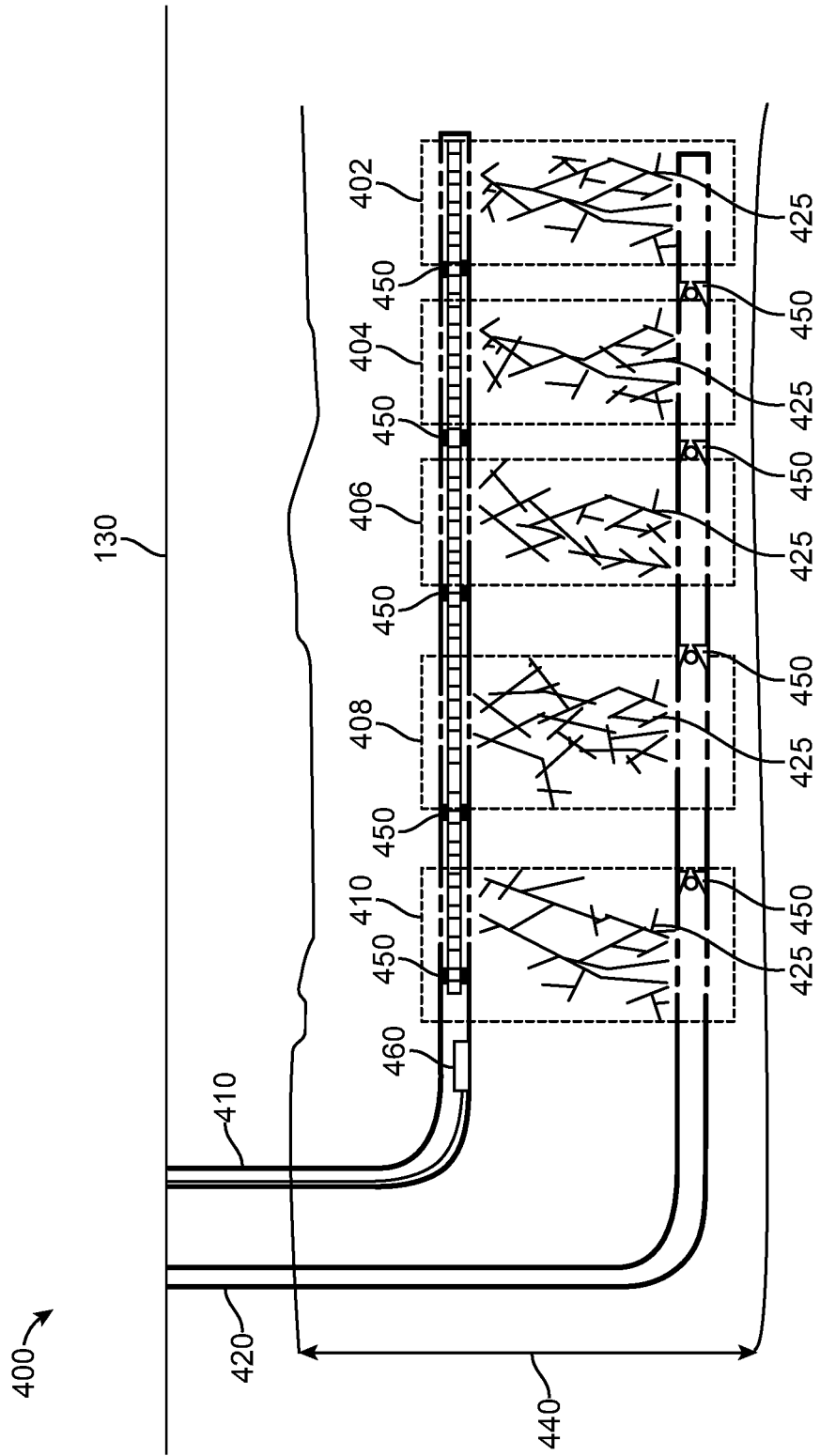
FIG. 4B is a diagram illustrating the exemplary wellbore network showing multiple vertical fractures.

As shown in FIG. 4B, the fracturing process can be repeated along the length of the lower wellbore 420 throughout the target area 440. For example, the lower wellbore 420 can be sealed uphole of the first location 402 using a downhole tool, such as a packer 450, then fractured at a second location 404, and completed as described above. The process of sealing and fracturing can be repeated as frequently as necessary throughout the horizontal length of the wellbore at various locations (i.e., 406, 408, 410) to achieve maximum proppant distribution throughout the target area 440. The enhanced proppant distribution can increase production of downhole fluids, such as hydrocarbons. Additionally, the enhanced placement allows for a reduced amount of proppant to be used during the extraction process, thus reducing waste. While FIGS. 4A and 4B only show physical diverting agents, such as packers 450, chemical diverting agents, or any other suitable means for diversion, may also be used to seal off sections of the wellbore. Typical chemical diverting agents include, but are not limited to, phenyl formaldehyde, lactone styrene derivatives, precipitated silica, elastomers, polyvinylidene chloride (PVDC), nylon, waxes, polyurethanes, cross-linked partially hydrolyzed acrylics, poly(hydroxyl alkanoate) (PHA), poly(alpha-hydroxy) acids, polyactic acid (PLA), polygylcolic acid (PGA), polyactide, polyglycolide, poly(beta-hydroxy alkanoates), poly(beta-hydroxy butyrate) (PHB), poly(beta-hydroxybutyrates-co-beta-hydroxyvelerate) (PHBV), poly(omega-hydroxy alkonates), poly(beta-propiolactone (PPL), poly(ε-caprolactone (PCL), poly(alkylene dicarboxylates), poly(ethylene succinate) (PES), poly(butylene succinate) (PBS), poly(butylene succinate-co-butylene adipate), polyanhydrides, poly(adipic anhydride), poly(orthoesters), polycarbonates, poly(trimethylene carbonate), poly(dioxepan-2-one), aliphatic polyesters, poly(lactides), poly(glycolides), poly(ε-caprolactones), poly(hydroxybutyrates), poly(anhydrides), aliphatic polycarbonates, poly(orthoesters), poly(amino acids), poly(ethylene oxides), polyphosphazenes, and/or combinations thereof.

Figure 5A:
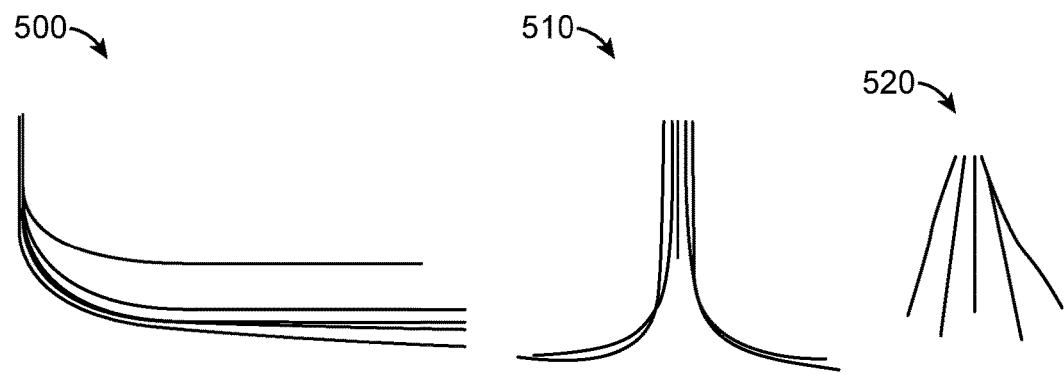
FIG. 5A is a diagram illustrating a wellbore schematic from several views.
Figure 5B:
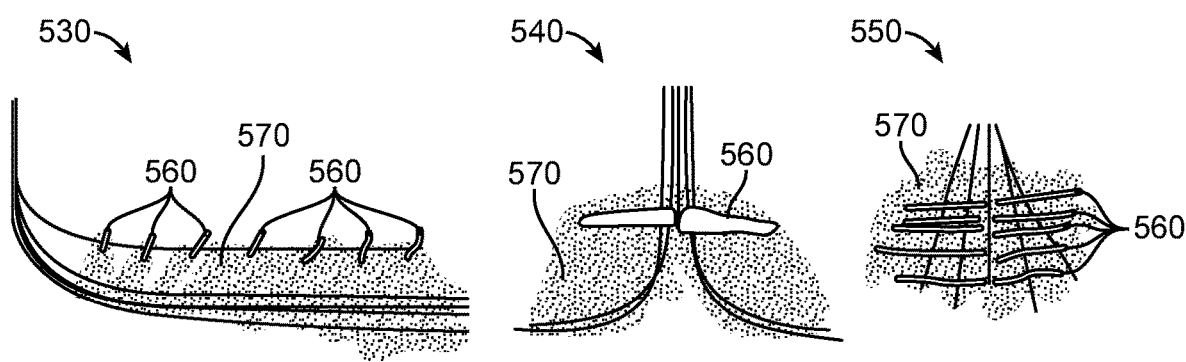
FIG. 5B is a diagram illustrating a wellbore schematic from several views after proppant is dispersed.

The above described method may be implemented in future infill drillings, to place a large number of wells around a prospected target area, allowing for better stimulation of the target area and higher inflow performance. Alternatively, multi-well pads can be stimulated using the above described method by placing wellbores below the central point of the target area. For example, an upper (or first) wellbore can be fractured in a standard manner to create lateral fractures, then multiple wellbores can be subsequently pressured and vertically fractured to allow flowback from the lower pads wells using the above described method. Specifically, FIGS. 5A and 5B illustrate an example of a multi-well pad. FIG. 5A illustrates a side view 500, front view 510, and top view 520 of the multi-wellbore environment. In multi-wellbore environments, enhanced proppant distribution can be achieved by controlling the pressure of one or more wellbores such that the pressure differential can be used to direct proppant to a desired area. FIG. 5B illustrates a side view 530, front view 540, and top view 550 of the same wellbore environment of FIG. 5A, after proppant has been dispersed. The views illustrate the receiving well 560 and the proppant stimulated area 570 within the environment.

Figure 6:
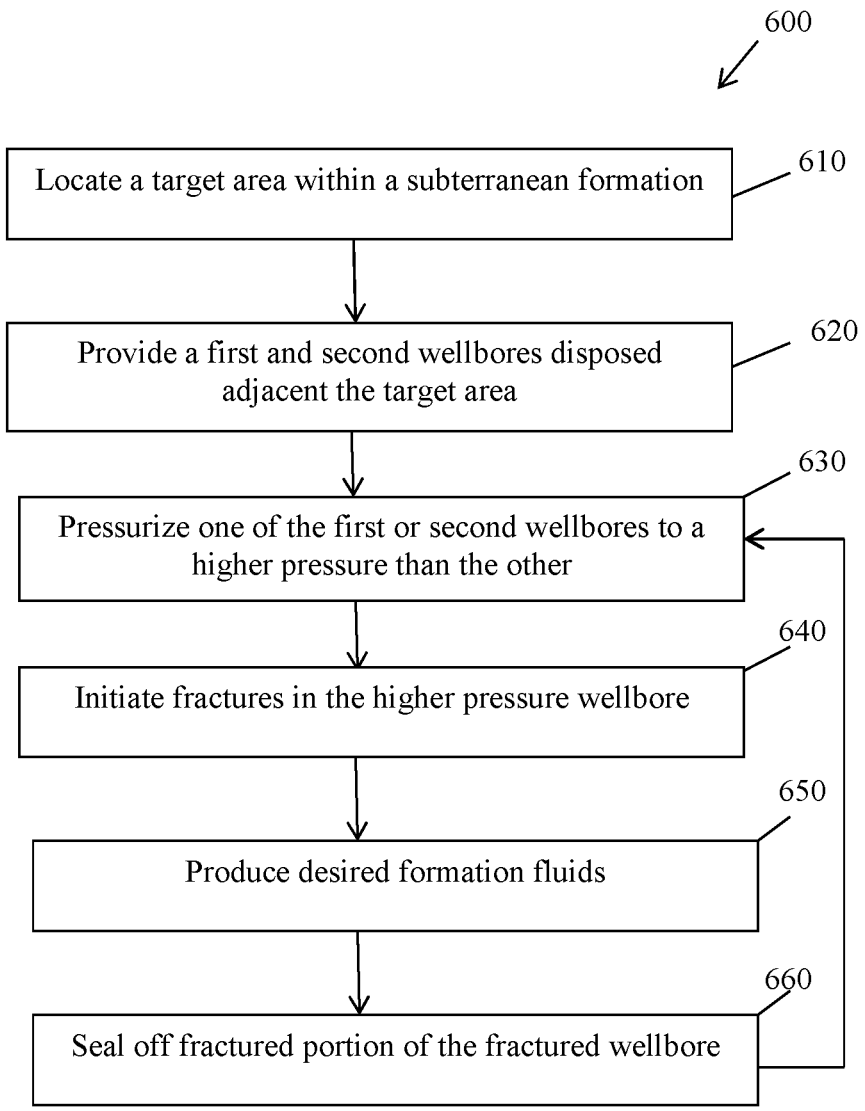
FIG. 6 is a flowchart of a method for controlling cross-flow between wellbores.

FIG. 6 illustrates a method 600 that can be used to enhance proppant distribution throughout a subterranean earth formation. For example, at block 610, a target area can be located within a subterranean formation. The target area can either be new or can be within a previously produced formation. As shown in block 620, a first and second wellbore can be located or provided adjacent a target area. For example, a first wellbore can be located adjacent to the target area, and subsequently, at block 620 a second wellbore can be drilled adjacent to a different portion of the formation, and may be below the first wellbore. Accordingly, the first wellbore may be an upper wellbore and the second wellbore a lower wellbore with respect to each other. As noted previously, the labeling of "first" and "second" wellbores is not necessarily indicative of any particular order of time with respect to drilling or achieving target pressures, but is for convenience of labeling. In order to enhance vertical proppant distribution, at block 630 the one of the first and second wellbores can be pressurized to create a pressure differential between the two wellbores. For example, the second wellbore may be pressurized, while the previously drilled first wellbore is maintained at a hydrostatic pressure and a pressure lower pressure than the surrounding area or the second wellbore. Any fluid may be employed for pressurizing the wellbore, and may be a fracturing fluid or other fluid. A proppant may be mixed with a fracturing fluid for propping created fractures. At block 640, the second wellbore is fractured at the terminal end, the pressure differential causing vertical distribution of the proppant and creating a hydraulic connection between the two wellbores. At block 650, the wellbore can be pumped to obtain formation fluid, for example producing hydrocarbon contained in the formation. At block 660, the fractured portion of the wellbore is sealed off, using a downhole tool such as, a packer. The process of pressurizing, fracturing, and pumping can be repeated along the length of the wellbore or the target area.

Numerous examples are provided herein to enhance understanding of the present disclosure. A specific set of statements are provided as follows.

Statement 1: A method for directing a proppant in a subterranean formation comprising providing a first wellbore and a second wellbore, wherein the first wellbore and the second wellbore are disposed about a target area of the subterranean formation; creating a pressure differential between the first wellbore and the second wellbore, such that the pressure of one of the first wellbore or the second wellbore is at a higher pressure and the other of the first wellbore or second wellbore is at a lower pressure; and initiating a fracturing pressure in the higher pressure wellbore by pumping a fracturing fluid in the wellbore, the fracturing pressure sufficient to create a fracture at a predetermined location; whereby the fracturing fluid is drawn from the fractured wellbore toward the lower pressurized wellbore as a result of the pressure differential.

Statement 2: A method according to Statement 1, wherein the fracturing fluid comprises a proppant.

Statement 3: A method according to Statement 1 or Statement 2, wherein the lower pressurized wellbore is the first wellbore.

Statement 4: A method according to Statements 1-3, further comprising maintaining the first wellbore at a hydrostatic pressure to form the pressure differential.

Statement 5: A method according to Statements 1-3, further comprising actively controlling the pressure of the first wellbore to a predetermined pressure to form the pressure differential.

Statement 6: A method according to Statements 1-5, wherein a choke is employed to control the pressure of the first wellbore.

Statement 7: A method according to Statements 1-6, further comprising establishing a hydraulic connection between the first wellbore and the second wellbore.

Statement 8: A method according to Statements 1-7, further comprising subsequent to establishing the hydraulic connection, establishing a flowback within the first wellbore.

Statement 9: A method according to Statements 1-8, wherein the first wellbore and the second wellbore are connected by a fracture network as a result of the fracturing.

Statement 10: A method according to Statements 1-9, further comprising sealing the fractured portion of the wellbore using a downhole tool.

Statement 11: A method according to Statements 1-10, further comprising fracturing the sealed wellbore at a second predetermined location, wherein the second predetermined location is uphole of the first predetermined location.

Statement 12: A method according to Statements 1-11, further comprising repeating the sealing and the fracturing steps throughout the wellbore at a plurality of locations.

Statement 13: A method according to Statements 1-12, wherein the higher pressure wellbore is disposed below the lower pressure wellbore.

Statement 14: A method according to Statements 1-13, further comprising placing one or more sensors within at least one of the first wellbore and the second wellbore, and monitoring, via the one or more sensors, the pressure in at least one of the first wellbore and the second wellbore.

Statement 15: A method according to Statements 1-14, wherein the one or more sensors are fiber optic sensors.

Statement 16: A method according to Statements 1-15, wherein the desired subterranean formation is a hydrocarbon containing zone.

Statement 17: A method according to Statements 1-16, further comprising providing a third wellbore, and controlling a relative pressure differential between the first wellbore, the second wellbore, and the third wellbore to draw the fracturing fluid toward the desired subterranean formation.

Statement 18: A system comprising a first and second wellbore disposed adjacent a target area in a subterranean formation; the second wellbore pressurized to a fracturing pressure by a fracturing fluid having a proppant, thereby fracturing the first wellbore at a predetermined location; the first wellbore maintained at a pressure below the second wellbore, forming a pressure differential between the first wellbore and the second wellbore; and a desired subterranean formation, whereby fracturing fluid is drawn from the second wellbore toward the first wellbore as a result of the pressure differential.

Statement 19: A system according to Statement 18, further comprising maintaining the second well at a hydrostatic pressure to form the pressure differential.

Statement 20: A system according to Statement 18, further comprising actively controlling the pressure of the second wellbore to maintain a predetermined pressure to form the pressure differential.

Statement 21: A system according to Statements 18-20, wherein a choke is employed to control the pressure of the second wellbore.

Statement 22: A system according to Statements 18-21, wherein a hydraulic connection is established between the first wellbore and the second wellbore.

Statement 23: A system according to Statements 18-22, wherein subsequent to establishing the hydraulic connection, a flowback is established within the first wellbore.

Statement 24: A system according to Statements 18-23, wherein the first wellbore and the second wellbore are connected by a fracture network as a result of the fracturing pressure.

Statement 25: A system according to Statements 18-24, further comprising sealing the fractured portion of the wellbore using a downhole tool.

Statement 26: A system according to Statements 18-25, further comprising fracturing the sealed wellbore at a second predetermined location, wherein the second predetermined location is uphole of the first predetermined location.

Statement 27: A system according to Statements 18-26, further comprising repeating the sealing and the fracturing steps throughout the wellbore at a plurality of locations.

Statement 28: A system according to Statements 18-27, wherein the second wellbore is disposed below the first wellbore.

Statement 29: A system according to Statements 18-28, further comprising placing one or more sensors within at least one of the first wellbore and the second wellbore, and monitoring, via the one or more sensors, the pressure in at least one of the first wellbore and the second wellbore.

Statement 30: A system according to Statements 18-29, wherein the one or more sensors are fiber optic sensors.

Statement 31: A system according to Statements 18-30, further comprising providing a third wellbore, and controlling a relative pressure differential between the first wellbore, the second wellbore, and the third wellbore to draw the fracturing fluid toward the desired subterranean formation.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A method for directing a proppant in a subterranean formation comprising:
    providing a first wellbore and a second wellbore, wherein the first wellbore and the second wellbore are disposed about a target area of the subterranean formation;
    creating a pressure differential between the first wellbore and the second wellbore, such that a pressure of one of the first wellbore or the second wellbore is at a higher pressure and the other of the first wellbore or the second wellbore is at a lower pressure;
    initiating a fracturing pressure in the higher pressure wellbore by pumping a fracturing fluid in the higher pressure wellbore, the fracturing pressure sufficient to create a fracture at a predetermined location; and
    whereby the fracturing fluid is drawn from the fractured higher pressure wellbore toward the lower pressure wellbore and a proppant is flowed into the created fracture from the higher pressure wellbore toward the lower pressure wellbore as a result of the pressure differential.

2. The method of claim 1, further comprising maintaining the lower pressure wellbore at a hydrostatic pressure to form the pressure differential.

3. The method of claim 1, further comprising actively controlling the pressure of the lower pressure wellbore to a predetermined pressure to form the pressure differential.

4. The method of claim 1, further comprising establishing a hydraulic connection between the first wellbore and the second wellbore.

5. The method of claim 1, further comprising sealing a fractured portion of the higher pressure wellbore using a downhole tool.

6. The method of claim 1, further comprising placing one or more sensors within at least one of the first wellbore and the second wellbore, and
    monitoring, via the one or more sensors, the pressure in at least one of the first wellbore and the second wellbore.

7. The method of claim 6, wherein the one or more sensors are fiber optic sensors.

8. The method of claim 1, wherein the higher pressure wellbore is disposed below the lower pressure wellbore.

9. The method of claim 1, further comprising providing a third wellbore, and controlling a relative pressure differential between the first wellbore, the second wellbore, and the third wellbore to draw the fracturing fluid toward a desired subterranean formation.

10. The method of claim 1, wherein the fracturing fluid is liquid.

11. The method of claim 1, wherein the fracturing fluid further comprises a gelling agent.

12. The method of claim 1, wherein the fracturing fluid carries the proppant from the surface and flowed into the created fracture by the fracturing fluid from the higher pressure wellbore with the fracturing fluid as a result of the pressure differential.

13. A system comprising:
a first wellbore and a second wellbore disposed adjacent a target area in a subterranean formation;
the second wellbore pressurized to a fracturing pressure by pumping a fracturing fluid in the second welbore, thereby fracturing the second wellbore at a predetermined location;
the first wellbore maintained at a pressure below the second wellbore, forming a pressure differential between the first wellbore and the second wellbore; and
whereby the fracturing fluid is drawn from the second wellbore toward the first wellbore and a proppant is flowed into the fracture from the second wellbore toward the first wellbore as a result of the pressure differential.

14. The system of claim 13, further comprising maintaining the first wellbore at a hydrostatic pressure to form the pressure differential.

15. The system of claim 13, further comprising actively controlling the pressure of the first wellbore to maintain a predetermined pressure to form the pressure differential.

16. The system of claim 15, wherein a choke is employed to control the pressure of the first wellbore.

17. The system of claim 13, wherein a hydraulic connection is established between the first wellbore and the second wellbore.

18. The system of claim 17, wherein subsequent to establishing the hydraulic connection, a flowback is established within the first wellbore.

19. The system of claim 13, wherein the first wellbore and the second wellbore are connected by a fracture network as a result of the fracturing pressure.

20. The system of claim 13, further comprising sealing a fractured portion of the second wellbore using a downhole tool.

21. The system of claim 20, further comprising fracturing the second wellbore having the sealed fracture portion at a second predetermined location, wherein the second predetermined location is uphole of the first predetermined location.

22. The system of claim 21, further comprising repeating the sealing and the fracturing steps throughout the second wellbore having the sealed fracture portion at a plurality of locations.

23. The system of claim 13, wherein the fracturing fluid is liquid.

24. The system of claim 13, wherein the fracturing fluid further comprises a gelling agent.

25. The system of claim 13, wherein the fracturing fluid carries the proppant from the surface and flowed into the fracture by the fracturing fluid from the second wellbore with the fracturing fluid as a result of the pressure differential.

* * * * *